S. T. FREAS.
DETACHABLE SEGMENT SAW.
APPLICATION FILED OCT. 3, 1917.
1,278,630.
Patented Sept. 10, 1918.
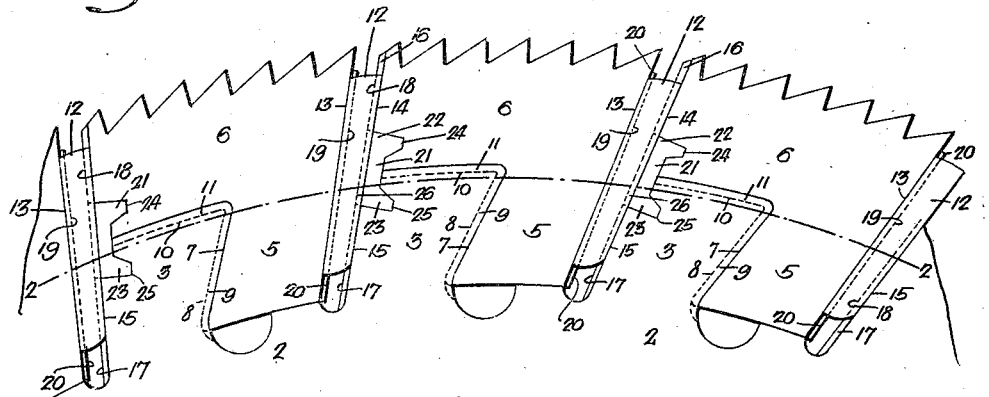
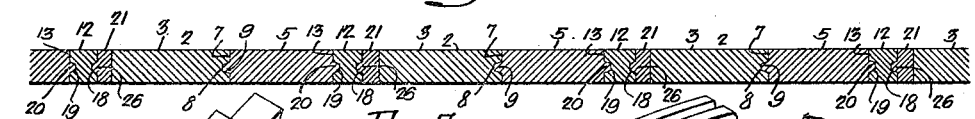
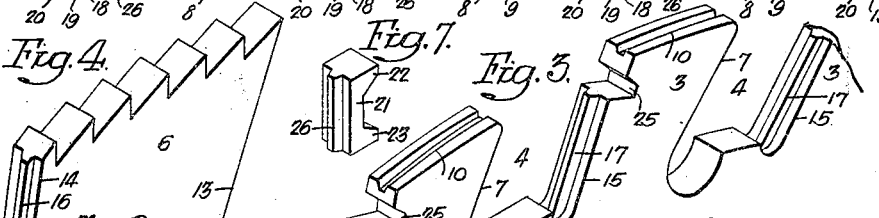
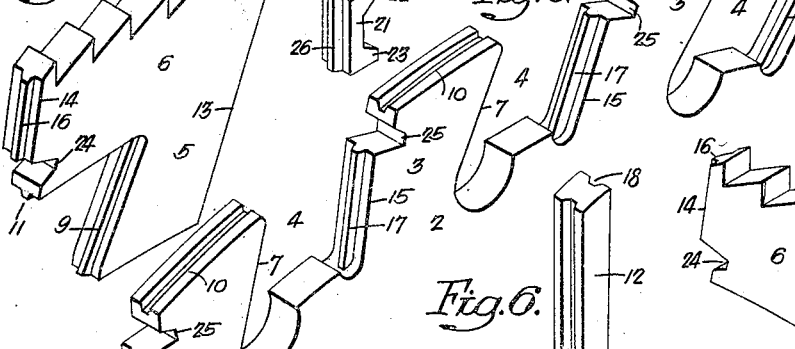
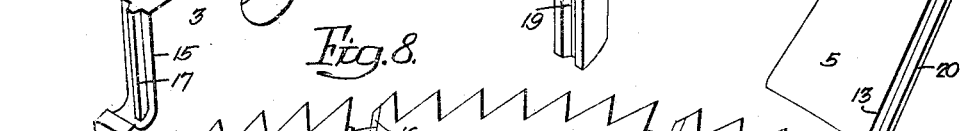
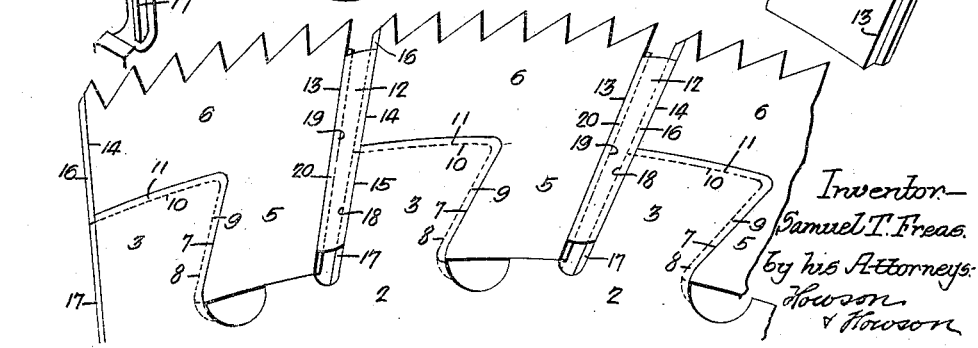
Inventor—
Samuel T. Freas.
by his Attorneys,
Howson
& Howson

UNITED STATES PATENT OFFICE.

SAMUEL T. FREAS, OF TRENTON, NEW JERSEY, ASSIGNOR TO HENRY DISSTON & SONS, INCORPORATED, OF PHILADELPHIA, PENNSYLVANIA, A CORPORATION OF PENNSYLVANIA.

DETACHABLE-SEGMENT SAW.

1,278,630.   Specification of Letters Patent.   Patented Sept. 10, 1918.

Application filed October 3, 1917. Serial No. 194,514.

*To all whom it may concern:*

Be it known that I, SAMUEL T. FREAS, a citizen of the United States, residing in Trenton, Mercer county, New Jersey, have invented certain Improvements in Detachable-Segment Saws, of which the following is a specification.

My invention relates to certain improvements in circular metal saws in which the teeth are made detachable. This application is a companion to an application filed by me of even date herewith under Serial No. 194,513.

One object of the invention is to improve the construction of metal saws of the detachable tooth type, so as to provide a continuous series of teeth placed comparatively close together and extending around the periphery of the saw blade.

A further object of the invention is to provide means for rigidly holding the toothed sections to the body of the blade.

In the accompanying drawing:—

Figure 1, is a side view of sufficient of a saw blade to illustrate my invention;

Fig. 2, is a sectional view on the line 2—2, Fig. 1;

Fig. 3, is a detached perspective view of a portion of the saw blade;

Figs. 4 and 5, are detached perspective views of one of the toothed sections;

Fig. 6, is a perspective view of one of the wedges;

Fig. 7, is a detached perspective view of one of the locking blocks; and

Fig. 8, is a side view of the saw blade showing the construction without the locking block.

Referring to the drawing, 2 is a saw blade having projections 3 spaced apart and forming recesses 4 for the reception of the extension 5 of the toothed section 6. This toothed section is L-shaped, as shown, and has a series of teeth at one edge. One edge 7 of each projection 3 is undercut and has a groove 8 therein and the extension 5 has a rib 9 adapted to the groove. In the outer edge of each projection 3 is a groove 10. As all of the projections are of the same height, this groove can be formed by a cutter at a single operation when the blade is mounted on a spindle.

The toothed section 6 has a rib 11 at its under side adapted to the groove 10, as clearly shown in the drawing, so that, when the parts are in position, the toothed section is prevented from moving laterally on the blade. In order to lock the toothed section firmly to the blade, I provide a wedge 12 between the wall 13 of one toothed section and the wall 14 of an adjoining toothed section and the wall 15 of the projection 3. On the walls 14 and 15 are ribs 16 and 17 respectively, which enter the groove 18 in the wedge 12. The groove 19 on the opposite side of the wedge is adapted to a rib 20 on the wall 13.

In large sizes of saws, this construction is all that is necessary as the wedges 12 will drive the interlocking extensions and projections together so tightly that they will be held rigidly in position. In saws of small sizes, I preferably provide a locking block 21, shown in detail in Fig. 7, having two beveled projections 22 and 23, one beveled projection being adapted to a recess 24 in a toothed section and the other being adapted to a corresponding recess 25 in the projection of the blade, as clearly shown in Fig. 1. At the back of the locking block is a rib 26, which alines with the ribs 16 and 17. This rib enters the groove 18 in the wedge 12 so that, when the wedge is driven, the locking block is forced into its recess and is firmly held therein by the wedge and in turn it binds the heel end of the toothed section to its seat on the projection.

In the drawing I have shown the toothed section 6 provided with a series of plain saw teeth, but it will be understood that the shape of the teeth may be changed to suit certain conditions, and the number of teeth may be varied if desired.

I claim:—

1. The combination in a saw, of a blade having a series of projections spaced apart, one edge of each projection being undercut; a series of L-shaped toothed sections having teeth at their outer edges and having an undercut extension adapted to fit the undercut projection of the blade; and a wedge located between one wall of a toothed section and the wall of the projection of the blade and the wall of an adjoining toothed section.

2. The combination of a blade having a series of projections spaced apart, one wall of each projection being undercut and grooved, the other wall being inclined and having a rib, the projection also having a groove at its outer edge with an L-shaped toothed section having an undercut extension adapted to the space between the projections of the blade, one edge of the extension having a rib fitting the groove in the undercut portion of the projection and having a rib on its other edge, the heel end of the body of the toothed section also having a rib; and a wedge located between the edge of one tooth section and the heel of an adjoining tooth section and the projection on the blade.

3. The combination of a blade having a series of projections spaced apart, one wall of each projection being undercut and the other wall being inclined; a series of L-shaped toothed sections adapted to the undercut projections of the blade; wedges for locking the sections together; and a series of interlocking blocks, each block having two projections, one extending into a recess in the heeled portion of the toothed section and the other extending into a recess in the projection of the blade, said block being held in place by the wedge.

4. The combination in a circular saw, of a blade having a series of projections all of the same height and spaced apart and forming recesses, one edge of each projection being inclined and the other edge being undercut, each projection having a groove in its outer edge; a series of L-shaped toothed sections adapted to fit the projections, the extensions of the sections being located in the space between the projections; and locking means engaging the sections and one wall of the projection of the blade.

In witness whereof I affix my signature.

SAMUEL T. FREAS.

Copies of this patent may be obtained for five cents each, by addressing the "Commissioner of Patents, Washington, D. C."